United States Patent
Long

[15] 3,678,667
[45] July 25, 1972

[54] LOOSE PEANUT RECOVERY APPARATUS

[72] Inventor: William R. Long, Tarboro, N.C.
[73] Assignee: Long Mfg. N.C. Inc., Tarboro, N.C.
[22] Filed: Aug. 2, 1971
[21] Appl. No.: 168,296

[52] U.S. Cl. ............................................. 56/130, 56/13.5
[51] Int. Cl. ............................................................ A01d 45/24
[58] Field of Search ................................. 56/126–130, 13.5; 130/30 C

[56] References Cited

UNITED STATES PATENTS

| | | |
|---|---|---|
| 1,727,431 | 9/1929 | Herr et al. .............................. 56/130 X |
| 2,974,467 | 3/1961 | Long ....................................... 56/128 |
| 3,053,034 | 9/1962 | Harrington et al. ...................... 56/130 |

Primary Examiner—Russell R. Kinsey
Attorney—A. Yates Dowell, Jr.

[57] ABSTRACT

Apparatus for gathering loose peanuts from the ground during the harvesting of the peanut crop so that a substantial portion of the crop, which previously had been lost, can be recovered. The apparatus includes a sweep assembly for removing peanuts from the ground and transferring the same to a peanut recovery unit which raises the peanuts to a higher elevation and discharges the same into a receptacle.

14 Claims, 17 Drawing Figures

Patented July 25, 1972

INVENTOR
WILLIAM R. LONG

BY
ATTORNEYS

Patented July 25, 1972

INVENTOR
WILLIAM R. LONG

BY
ATTORNEYS

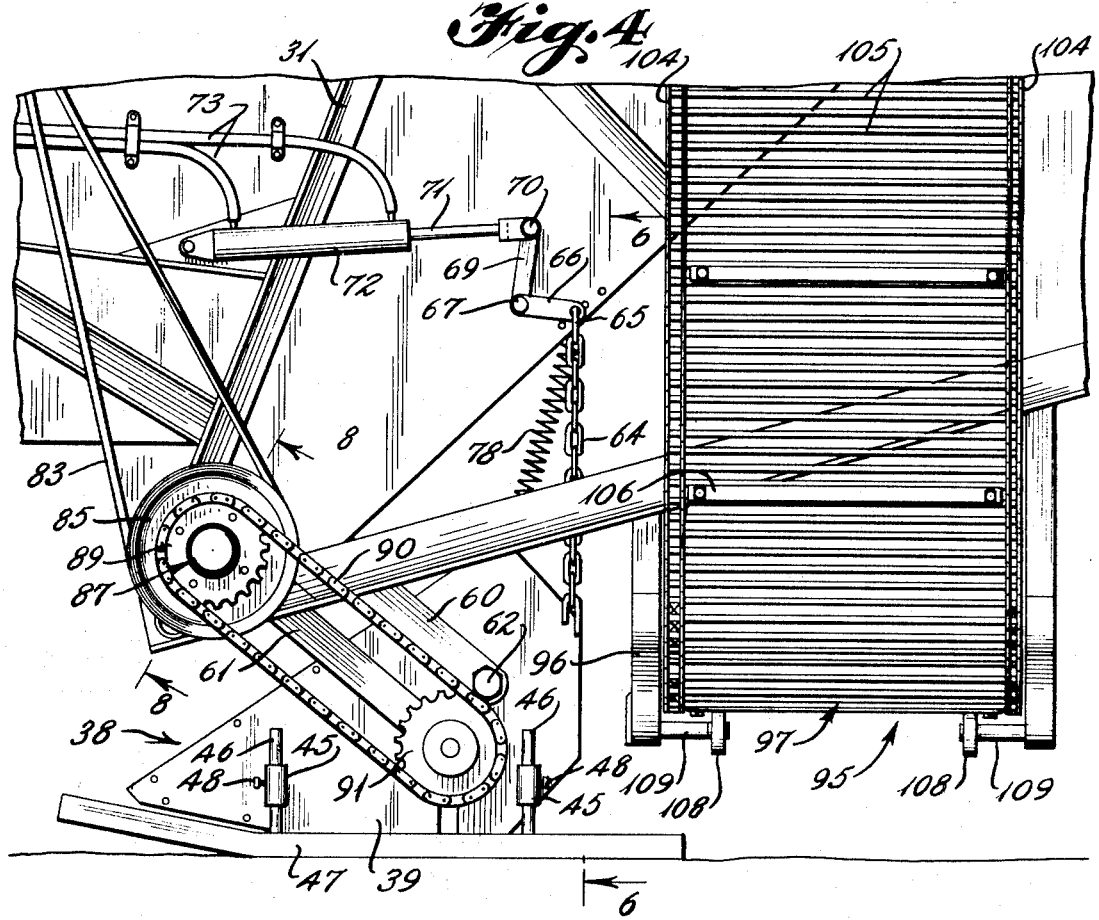
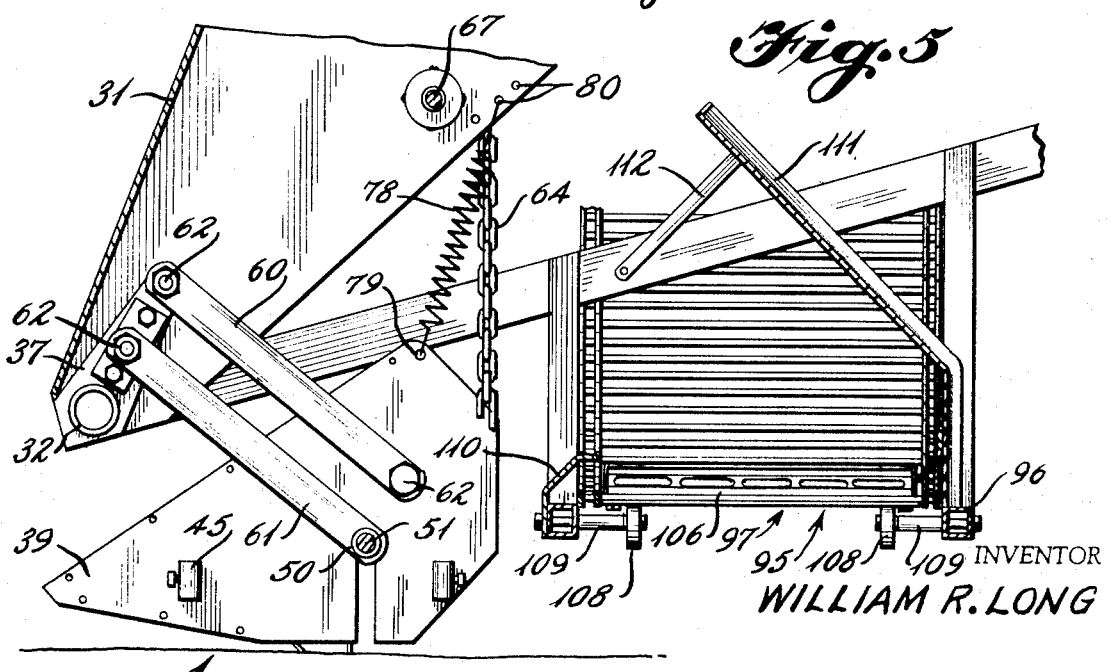

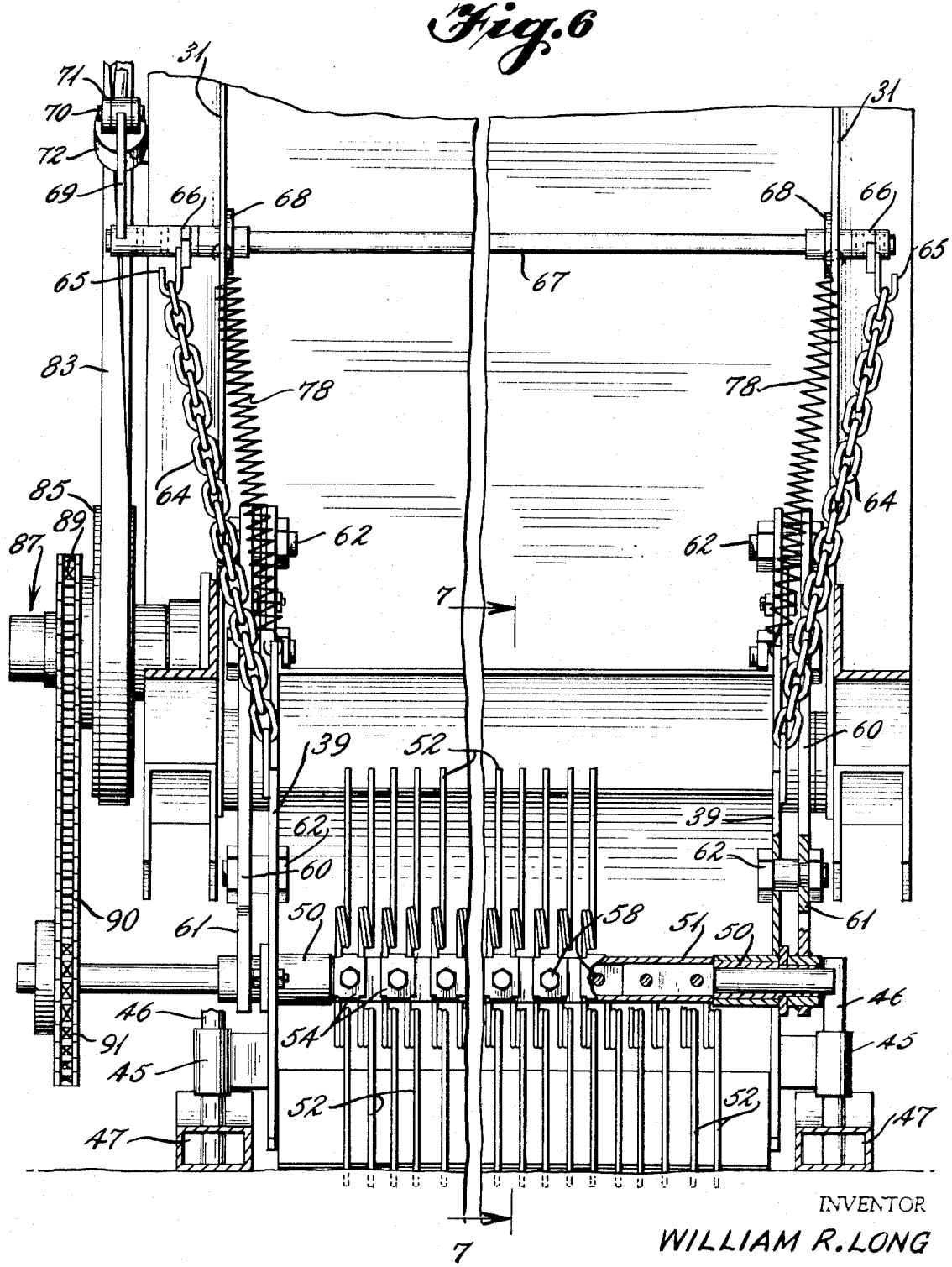

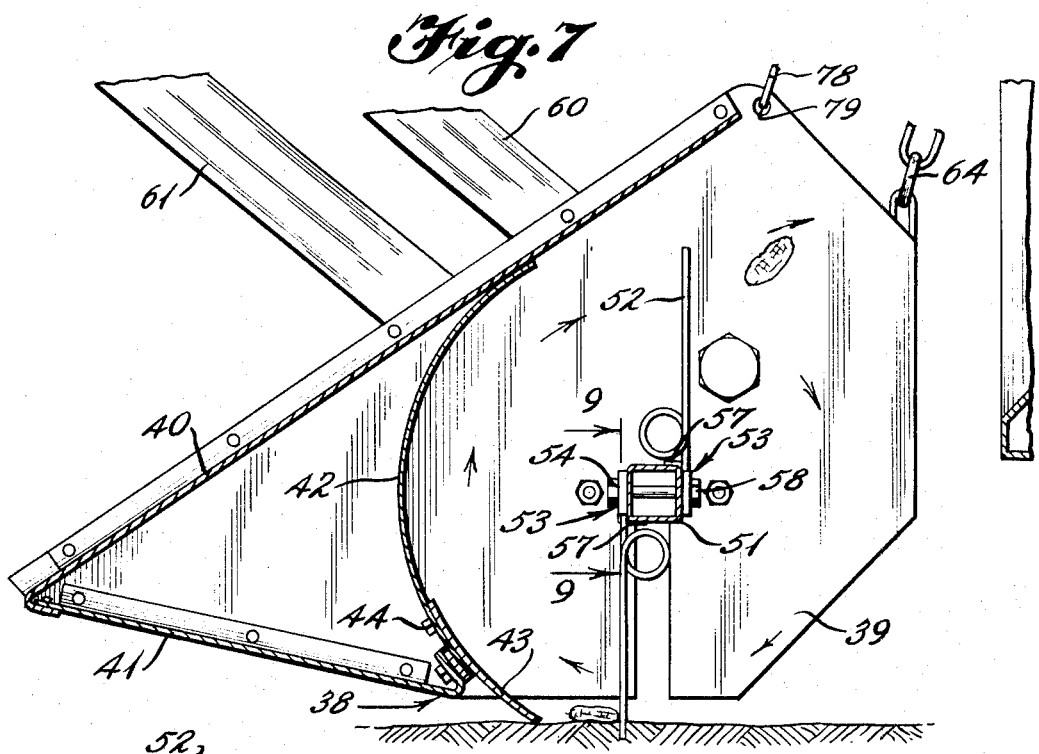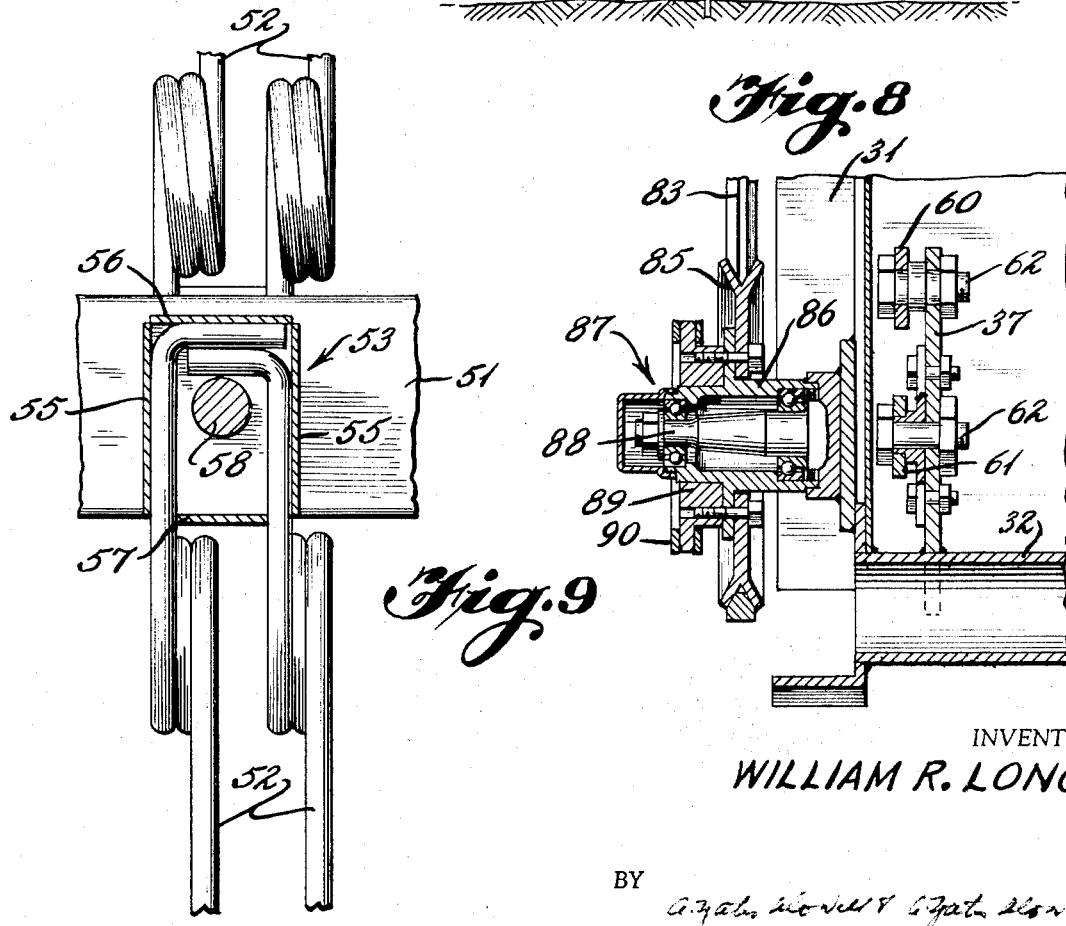

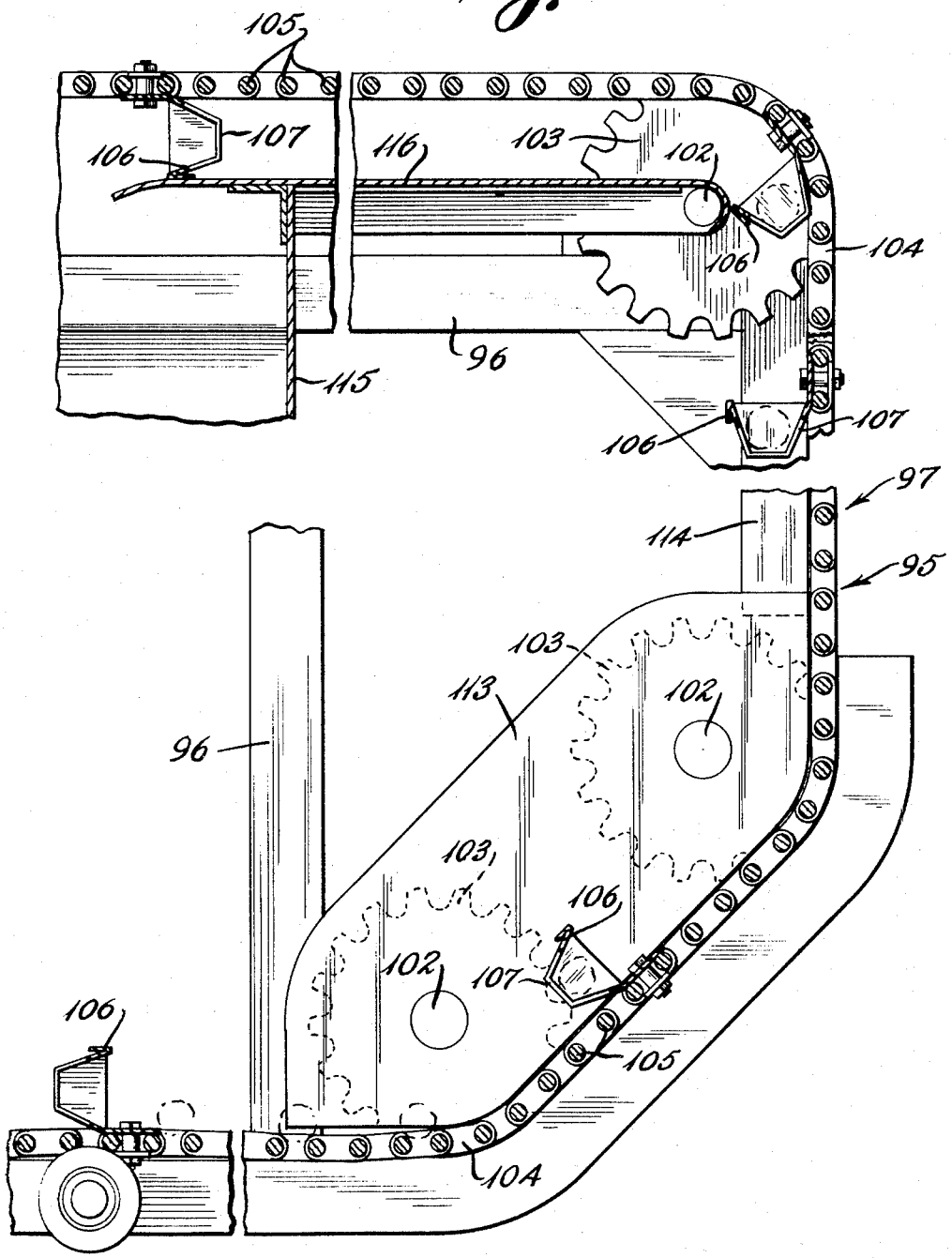

INVENTOR
WILLIAM R. LONG

BY
ATTORNEYS

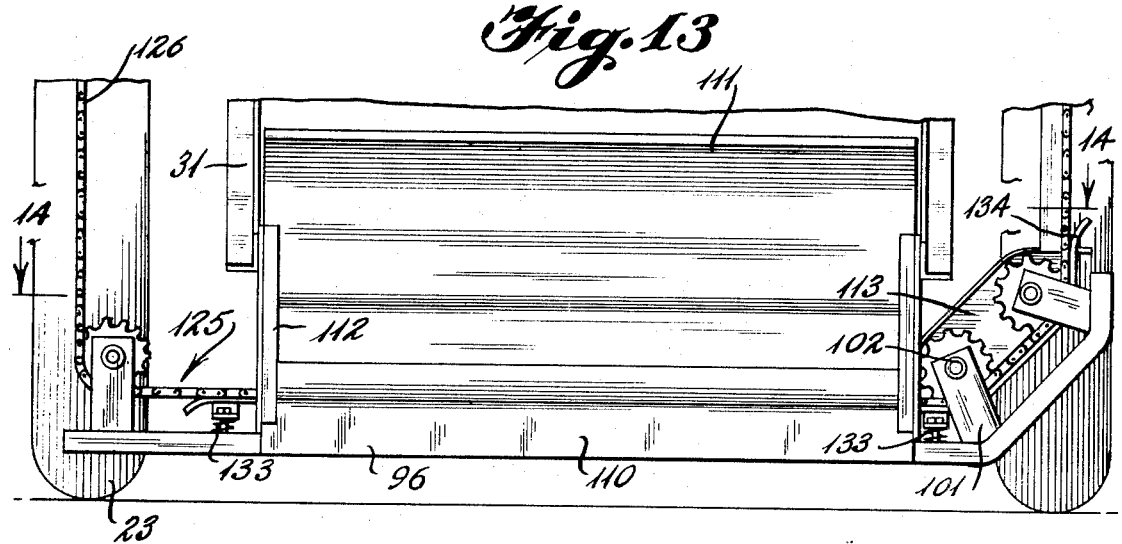
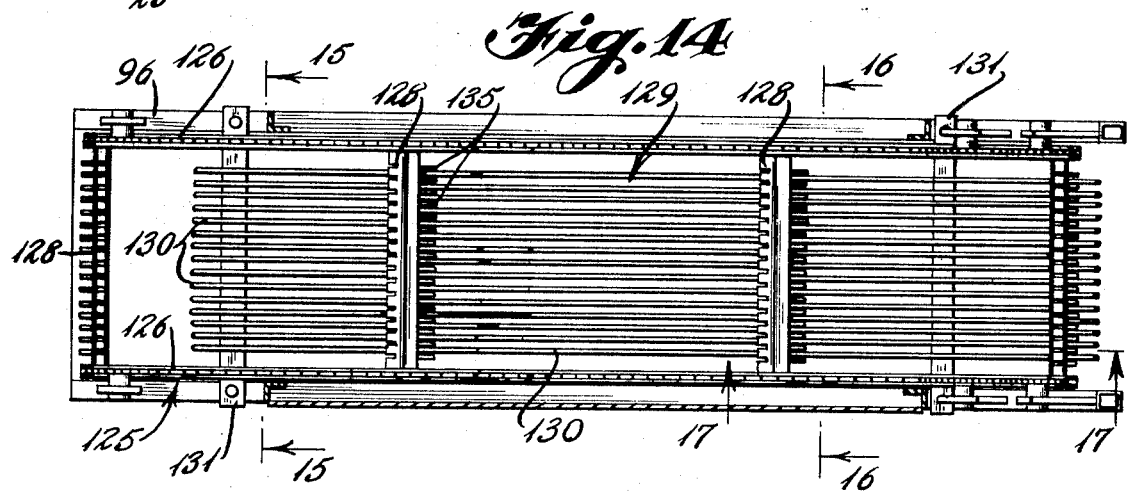
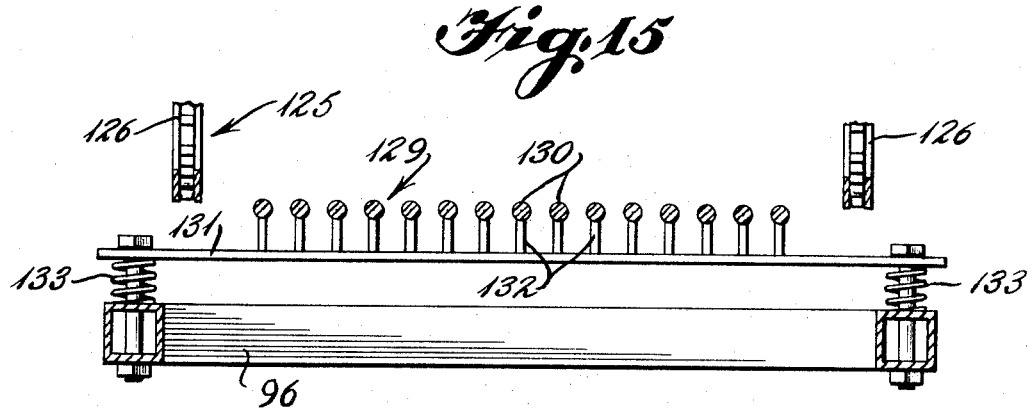
INVENTOR
WILLIAM R. LONG

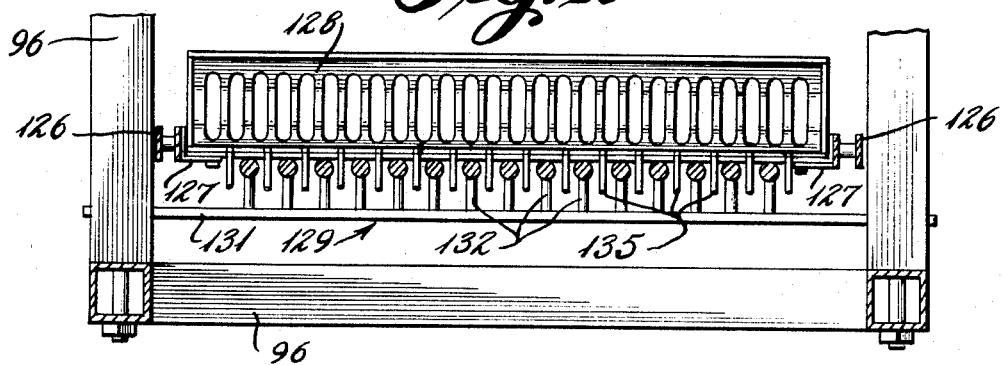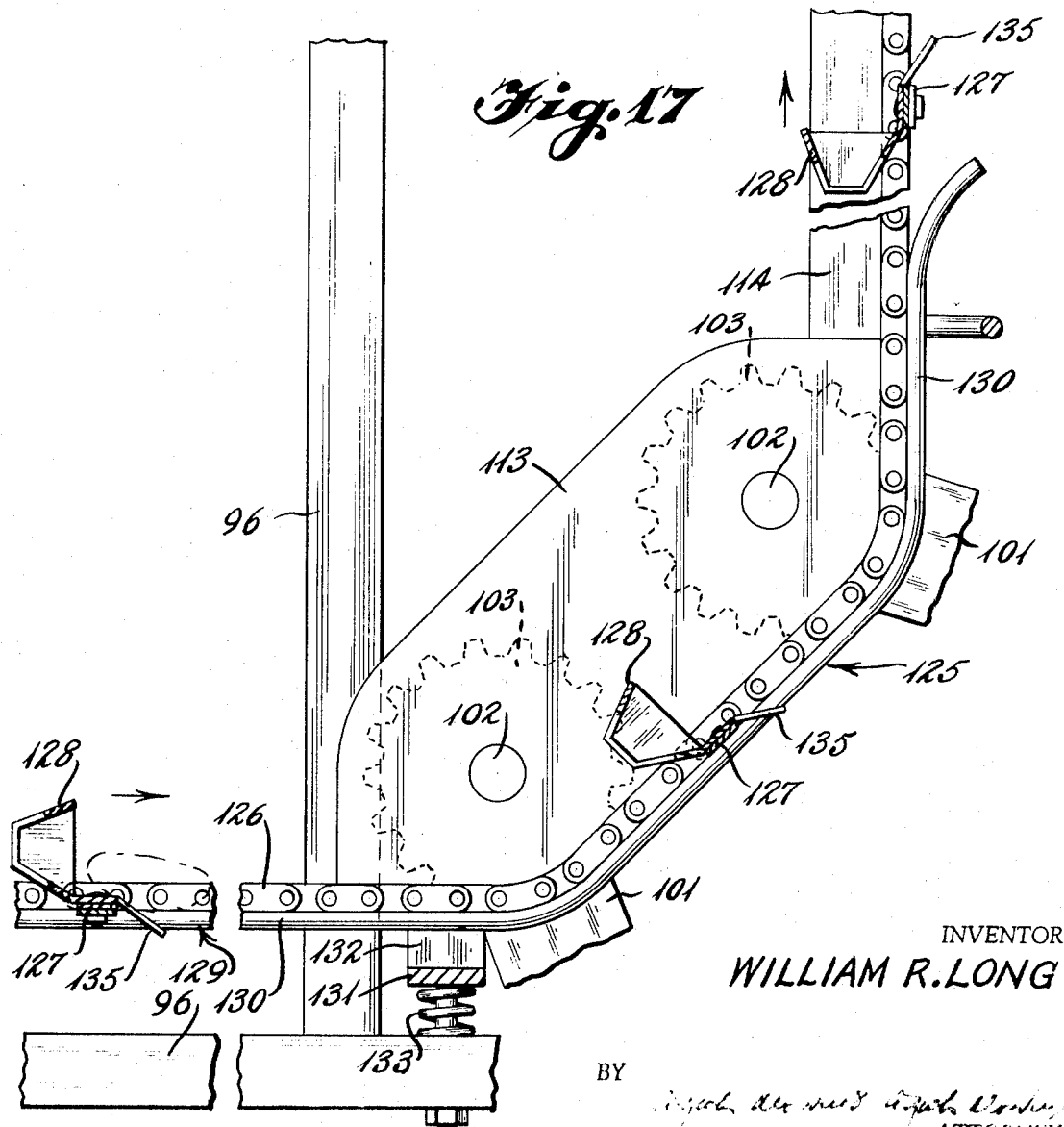

LOOSE PEANUT RECOVERY APPARATUS

BACKGROUND OF THE INVENTION

1. Field of the Invention

This application relates generally to harvesting machines of various kinds and relates particularly to apparatus for harvesting peanuts which have been at least partially dried in the field, as well as apparatus which will pick up loose peanuts from the earth and transfer the same into a receptacle for subsequent processing.

2. Description of the Prior Art

Heretofore many efforts have been made to harvest agricultural crops of various kinds with a minimum loss of the valuable food product being harvested. In the harvesting of peanuts, the problem of saving substantially all of the usable food product has been particularly severe since peanuts entail harvesting problems peculiar to this one product. Normally when the peanuts are ripe, the vines with peanuts attached are dug from the ground and are left in the field to dry for a period of from three to ten days, depending upon weather conditions. The peanut vines are left in the field after being dug to permit the stems and peanuts to dry so that the peanuts can be separated from the vines more easily with less damage to the peanuts, as well as to reduce subsequent artificial drying time. After the peanuts have at least partially dried in the field, a peanut combine such as that disclosed in U.S. Pat. Nos. 2,974,467 and 3,007,475 moves through the field, gathers up the peanut vines, separates the peanuts from the vines, discharges the vines back onto the field, cleans the separated peanuts, and discharges the same into a hopper or other receptacle. The vines which are discharged back onto the field normally are plowed under for their fertilizer value, as well as to make the soil more friable.

During the digging and drying of the vines, a substantial percentage of the peanuts become separated from the vines either when the peanuts are pulled from the earth or after the vines have dried and the stems become brittle so that the weight of the peanuts will break the stems and permit the peanuts to fall to the ground. Since the peanut combine picks up only the vines and the peanuts still attached thereto, the loose peanuts which have fallen onto the ground have been lost. Prime, large kernel peanuts weigh more than other peanuts and such extra weight has a tendency to cause the brittle stems to break so that a higher percentage of prime peanuts has been lost in comparison to medium and small kernel peanuts.

Some efforts have been made to provide apparatus for salvaging loose peanuts, however, these prior devices have been bulky and inefficient, have been expensive to produce and maintain, have become jammed easily so that they did not function properly, have included an excessive amount of dirt in the material picked up, have failed to harvest peanuts below or partially below the surface of the earth, and for other reasons have not been satisfactory. As an example, the Harrington et al. U.S. Pat. No. 3,053,034 discloses mechanism for recovering loose peanuts; however, this structure includes an endless belt conveyor onto which surface peanuts, dirt, rocks and other debris are swept. Some of the material sifts through the upper run of the conveyor and collects on the lower run where it interferes with operation of the conveyor.

SUMMARY OF THE INVENTION

The present invention is a loose peanut recovery apparatus or scavenger which normally is attached to a peanut combine to pick up loose peanuts from the ground and thereby save a valuable portion of the peanut harvest which heretofore has been lost. The recovery apparatus includes a pickup or sweep unit having a plurality of rows of spring tines or fingers adapted to penetrate the earth for a distance of approximately 1 inch to engage the peanuts on and immediately below the surface of the earth and discharge such peanuts onto an endless conveyor. The conveyor has a plurality of spaced receptacles which collect the peanuts and raise the same to a higher elevation after which the peanuts are discharged therefrom. As illustrated, the peanuts are discharged from the receptacles into the threshing portion of the combine so that the peanuts which were lying on the ground will be cleaned and discharged into the peanut hopper of the combine. However, it is contemplated that the peanuts could be discharged from the receptacles directly into a separate hopper or container.

The present device was tested under actual conditions with the result that a combine not using a recovery apparatus harvested two acres of peanuts and collected 4,790 pounds of which approximately 28 percent were prime large kernels. Many peanuts were observed still on the ground. An adjacent two acres of peanuts having substantially the same growth characteristics then were harvested by the same combine but using the peanut recovery apparatus of the present invention. This time the combine harvested 5,856 pounds of peanuts of which approximately 34 percent were prime large kernels and substantially no peanuts were observed on the ground. The difference was 1,066 additional pounds of peanuts which were harvested by the combine using the peanut recovery apparatus.

The peanuts harvested without the recovery apparatus were sold for approximately $14.00 per hundred pounds or a total of approximately $670. Since the peanuts harvested with the recovery apparatus had a larger percentage of large kernels, the peanuts sold for approximately $14.25 per hundred pounds or a total of approximately $834. The difference of $164 represents an increase of approximately $82.00 per acre over what the farmer received for peanuts harvested without the present device.

It is an object of the invention to provide a loose peanut recovery apparatus which will remove individual loose peanuts from the ground and discharge such peanuts into a receptacle.

Another object of the invention is to provide a loose peanut recovery apparatus having a sweep for removing individual peanuts from the ground and discharging such peanuts into buckets which raise such peanuts to a higher elevation and discharge the peanuts into a receptacle.

BRIEF DESCRIPTION OF THE DRAWINGS

FIG. 4 is an enlarged fragmentary section on the line 4—4 of FIG. 3.

FIG. 5 is an enlarged fragmentary section on the line 5—5 of FIG. 3.

FIG. 6 is an enlarged section on the line 6—6 of FIG. 4.

FIG. 7 is a section on the line 7—7 of FIG. 6.

FIG. 8 is an enlarged fragmentary section on the line 8—8 of FIG. 4.

FIG. 9 is an enlarged section on the line 9—9 of FIG. 7.

FIG. 10 is an enlarged fragmentary section on the line 10—10 of FIG. 1.

FIG. 13 is a section similar to FIG. 3 of a modified form of the invention.

FIG. 14 is a section on the line 14—14 of FIG. 13.

FIG. 15 is an enlarged section on the line 15—15 of FIG. 14.

FIG. 16 is an enlarged fragmentary section on the line 16—16 of FIG. 14.

FIG. 17 is an enlarged fragmentary section on the line 17—17 of FIG. 14.

DESCRIPTION OF THE PREFERRED EMBODIMENTS

Figure 1:
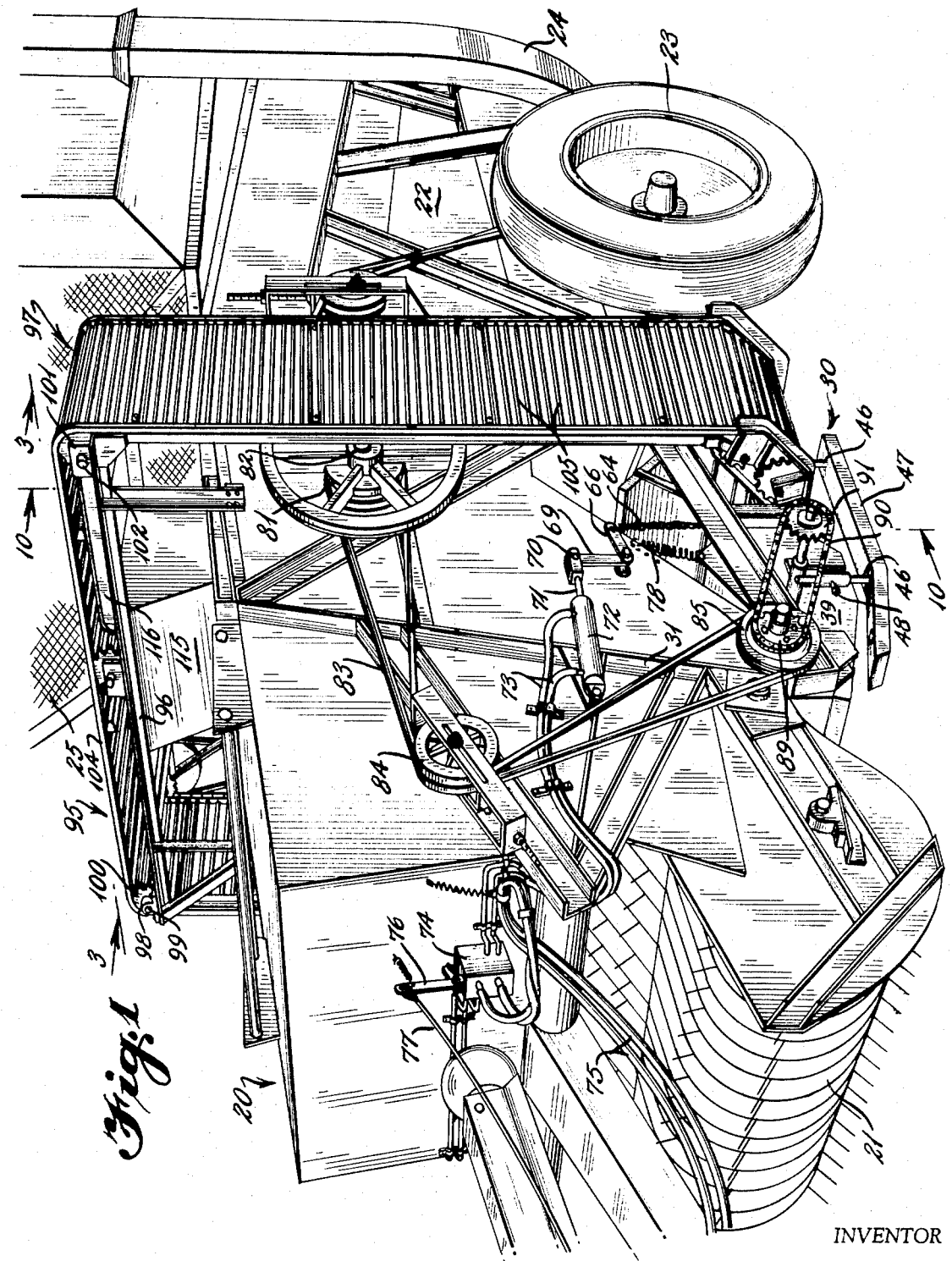
FIG. 1 is a front perspective of one side of a peanut combine illustrating a peanut recovery apparatus mounted thereon.

With continued reference to the drawings, FIG. 1 illustrates a peanut combine 20 of conventional character such as that in the aforementioned U.S. Pat. Nos. 2,974,467 and 3,007,475 having a pickup mechanism 21 located at the forward end of a body 22 mounted on ground-engaging wheels 23. The body includes a threshing section having one or more cylinders for separating the peanuts from the vines, as well as means for discharging the vines from the rear of the machine onto the ground and means for cleaning the separated peanuts and discharging the same through an elevator 24 to a hopper 25 mounted on the body 22.

The combine may be pulled through the field by a propelling vehicle (not shown) or may be self-propelled. When the combine is pulled by a propelling vehicle, the power driven elements of the combine may be operated from the power takeoff of the vehicle, or if desired such elements could be driven by an independent power plant mounted on the combine. Regardless of how the elements are driven, there is sufficient power available to drive the elements of the combine at a desired or required speed. The structure thus far described is conventional and forms no part of the present invention.

As illustrated in FIG. 1, a peanut recovery apparatus 30 is mounted on the combine 20 rearwardly of the pickup mechanism 21 and forwardly of the rear end of the body 22 so that the peanut vines will be passing through the combine and will not be a hindrance in recovering loose peanuts which were left on the ground. The peanut recovery apparatus is mounted on a frame 31 (FIGS. 1 and 8) forming part of the body 22 and the lower portion of such frame has a pipe 32 fixed within the side walls of the lower frame as added support. A pair of levers 37 are welded or otherwise attached to the fixed pipe 32 at opposite sides of the frame 31 for a purpose to be described later.

A sweep assembly 38 is provided and such sweep assembly includes a housing having spaced generally parallel end walls or plates 39 connected by upper and lower walls 40 and 41, respectively. A generally arcuate partition 42 connects the upper and lower walls 40 and 41 intermediate the length of the end walls 39. If desired, an arcuate extension 43 can be adjustably mounted on the partition 42 by means of screws or other fasteners 44. Each of the end walls 39 is provided with a pair of spaced generally parallel vertically disposed sleeves 45 and such sleeves slidably receive upstanding posts 46 welded or otherwise fixed to a skid or other ground-engaging support member 47 at each side of the sweep assembly. Preferably the sleeves 45 are provided with means, such as set screws 48, for adjustably securing the posts 46 in fixed position within the sleeves.

Each of the end walls 39 of the sweep assembly is provided with a bearing 50 which rotatably receives a shaft 51 extending from end to end of the sweep assembly 38. Intermediate the end walls, the shaft 51 is provided with a plurality of spring fingers or tines 52 each of which is of a length to extend below the lower surface of the end walls 36. As illustrated in FIGS. 6 and 7, the central portion of the shaft 51 is generally square in cross-section and the spring fingers 52 are mounted on opposite sides of such shaft and extend in opposite directions. If desired, additional fingers may be mounted on the other two sides of the shaft 51.

In order to mount the spring fingers 52 on the shaft, a housing 53 is provided having a top wall 54 connected to side walls 55 and end walls 56 and 57 within which a pair of fingers 52 are confined. As illustrated in FIG. 7, the housing 53 is disposed along one side of the shaft 51 and the end wall 57 extends along another side of the shaft 51 to prevent rotation of the housing 53 and the spring fingers 52. A bolt 58 extends through the shaft 51 and through housings 53 on opposite sides thereof to secure housings on opposite sides of the shaft.

As illustrated in FIG. 9, the upper ends of the pair of adjacent spring fingers 52 are bent toward each other and are arranged in overlapping relationship within the housing 53 and between the end wall 56 and the bolt 58. Such end wall and bolt prevent up-and-down movement of the fingers while the top wall 54 and shaft 51 prevent rotation of such fingers.

When the shaft 51 is rotated in a clockwise direction, as illustrated in FIG. 7, the outer free ends of the spring fingers 52 will pass in close proximity to the arcuate partition 42 and the extension 43 of the sweep assembly.

In order to raise and lower the sweep assembly 38, upper and lower generally parallel links 60 and 61 are provided at each side of the sweep assembly. The upper link 60 is swingably connected by pivot pins 62 at one end to the lever 37 and at the opposite end to the end wall 39 of the sweep assembly. The lower link 61 is connected at one end to the lever 37 by a pivot pin 62 and the opposite end is welded or otherwise attached to a bearing 63 which rotatably receives the reduced end portion of the shaft 51. A lift chain 64 is welded or otherwise attached at one end to each of the end walls 39 of the sweep assembly. The opposite end portion of each of the chains 64 is connected to a hook 65 fixed to a lever 66 secured to opposite ends of a shaft 67. The shaft 67 is rotatably mounted in bearings 68 carried by the frame 31. As illustrated in FIGS. 1, 4 and 6, a lever 69 is fixed on the shaft 67 and such lever is connected by a pin 70 to the piston rod 71 of a fluid cylinder 72 by means of which the shaft 67 is rotated to raise and lower the sweep assembly.

With reference to FIG. 1, the fluid cylinder 72 is connected by fluid lines 73 to a distributor valve 74 supplied with fluid under pressure from an external source through fluid lines 75. An operating lever 76 is mounted on the valve 74 and such lever is adapted to be operated by a cable 77 from a remote position, such as by the operator of the propelling vehicle. As illustrated, the valve 74 may be operated in one direction to raise and lower the sweep assembly and may be operated in another direction to raise and lower the hopper 25. If desired, a counterbalance spring 78 may have one end received within an opening 79 in the upper portion of each of the end walls 39 and the opposite end received within one of a plurality of openings 80 in the frame 31.

The shaft 51 which carried the spring fingers 52 is adapted to be driven in any desired manner. However, as illustrated in FIG. 1, a drive pulley 81 is mounted on a shaft 82 extending from the body 22. The shaft 82 is driven either from the power takeoff of the propelling vehicle or from an independent power plant mounted on the combine 20. The pulley 81 drives a belt 83 which extends over an adjustable idler 84 to a driven pulley 85 mounted on a hub 86 of a spindle assembly 87. As illustrated in FIG. 8, the hub 86 is freely rotatably mounted on a spindle 88 welded or otherwise attached to the frame 31 in such a manner that the axis of the spindle is generally in alignment with the axis of the pivot pin 62 connecting the lower link 61 to the lever 37. A drive sprocket 89 is connected to the hub 86 in a position to be driven by the pulley 85 and such drive sprocket is connected by a chain 90 to a sprocket 91 fixed to the shaft 51 so that rotation of the sprocket 91 will rotate the spring fingers 52. If desired, suitable clutches (not shown) can be provided for disengaging a drive mechanism so that the shaft 51 will be rotated only when desired.

Figure 3:
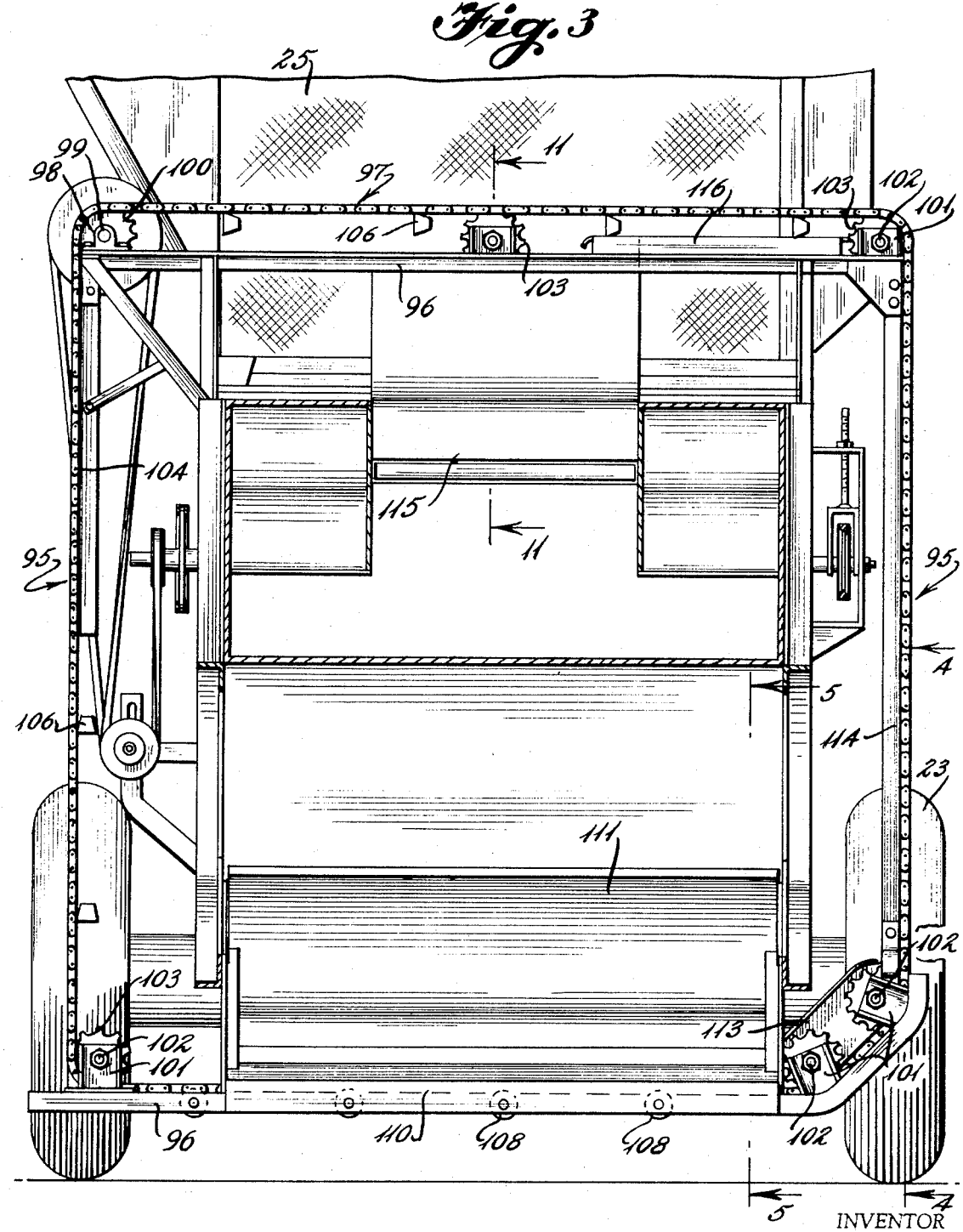
FIG. 3 is an enlarged section along the line 3—3 of FIG. 1.
Figure 11:
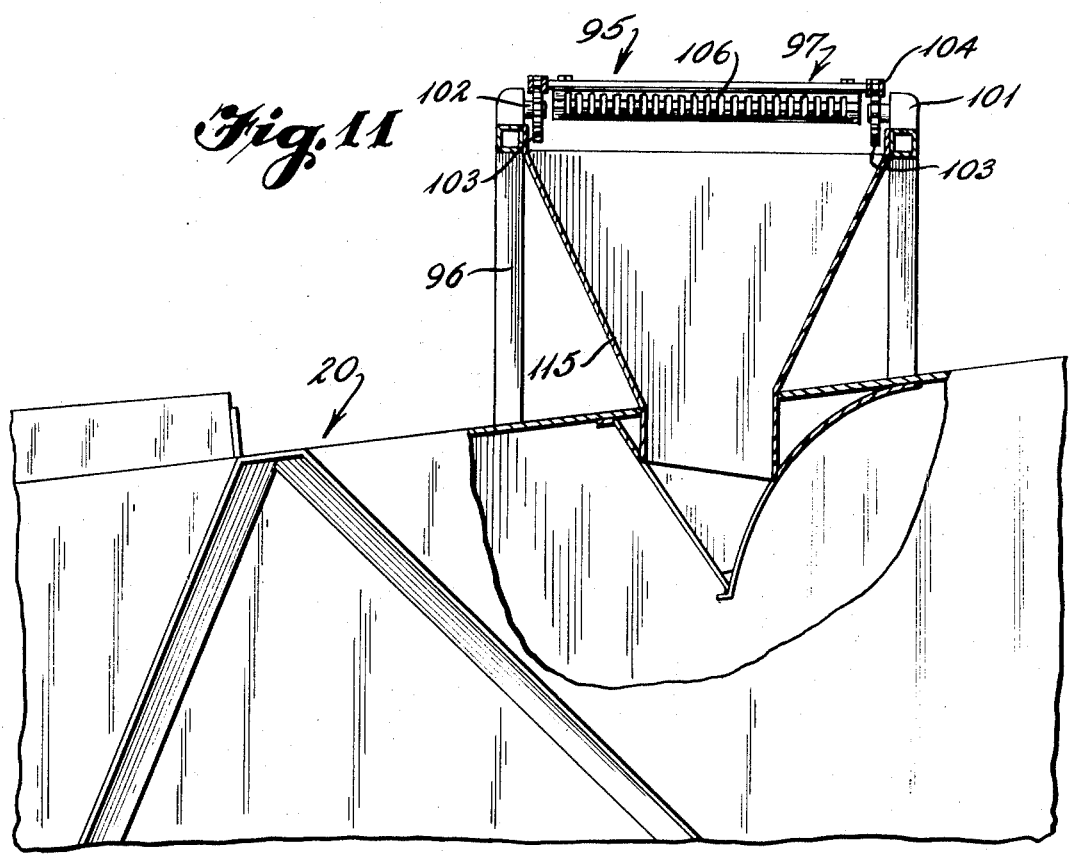
FIG. 11 is an enlarged section on the line 11—11 of FIG. 3.

Spaced rearwardly from the sweep assembly 35, a peanut recovery unit 95 is provided onto which peanuts lifted from the ground by the sweep assembly are discharged. The recovery unit includes a frame 96 connected to and supported by the frame 31 and an endless conveyor 97 carried by the frame 96. As illustrated in FIGS. 1 and 3, a pair of pillow blocks or bearings 98 are mounted at an upper corner of the frame 96 and such pillow blocks support an elongated shaft 99 on which spaced drive sprockets 100 are mounted.

Figure 12:
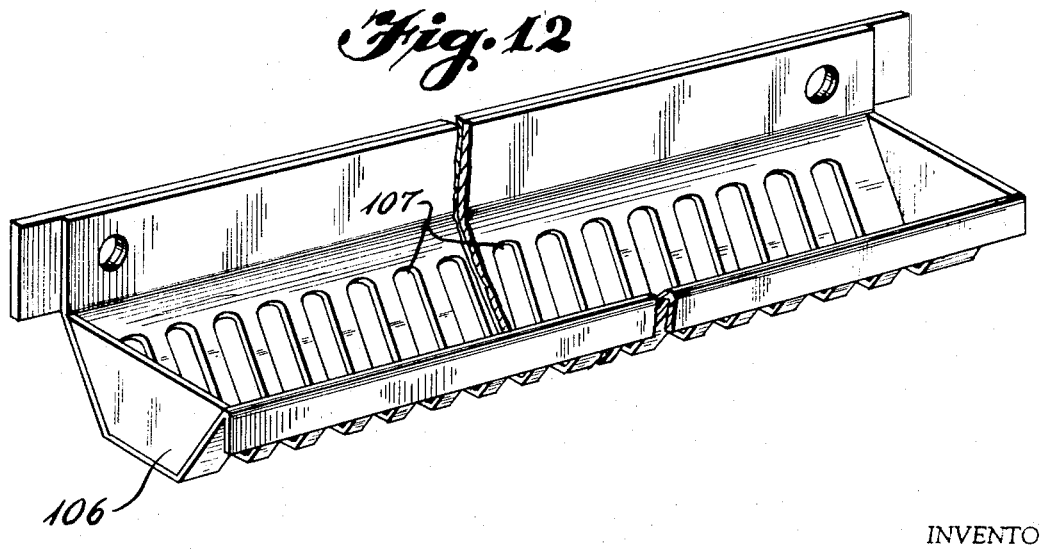
FIG. 12 is an enlarged perspective of one of the collection buckets.

At other portions of the frame 96 a plurality of pairs of stub shaft mounting members 101 are mounted and each mounting member 101 is adapted to support a stub shaft 102 which, in turn, supports idler sprockets 103. The drive sprockets 100 engage and drive chains 104 forming a portion of the flexible endless conveyor 97 while the idler sprockets 103 guide the conveyor around the frame 96. The endless conveyor 97 includes a multiplicity of closely spaced rods 105 extending from one chain to the other and at spaced intervals along the conveyor are located a series of buckets or receptacles 106 which collect peanuts discharged onto the endless conveyor, as will be described presently. Each of the buckets 106 normally is made of sheet material having a plurality of slots or openings 107 (FIG. 12) for the discharge of dirt and other foreign matter although, if desired, such buckets could be made of a wire mesh or other material.

Across the lower portion of the frame 96, the conveyor 97 is supported by a plurality of rollers 108 freely rotatably mounted on shafts 109 carried by the frame 96. The rollers 108 normally engage and support the rods 105 of the endless conveyor and insure that the lower run is generally parallel with the ground. The rods 105 are spaced apart a distance to prevent mature peanuts from falling between same, but permitting dirt, small rocks and other foreign objects to be discharged from the endless conveyor back to the ground. The striking of the rods 105 against the rollers 108 vibrates the rods and shakes the peanuts to dislodge dirt clinging thereto.

Across the lower part of the frame 96 and along the forward edge is provided a shield 110 which extends upwardly over one side of the endless conveyor 97. At the rear of the frame 96, an upwardly extending deflector 111 is disposed above and at the other or rearward side of the endless conveyor 97. If desired, the upper portion of the deflector may be supported by braces 112 connecting the deflector to the frame 31. Peanuts that are picked up from the ground by the sweep assembly 38 are thrown rearwardly by the spring fingers 52 over the top of the shield 110 either onto the endless conveyor 97 or against the deflector 111 from which they fall by gravity onto the endless conveyor.

As illustrated in FIGS. 3 and 10, at one side of the frame 96, the endless conveyor 97 moves upwardly at an angle of approximately 45° between two pairs of idler sprockets 103 so that the peanuts supported by the rods 105 will gravitate downwardly into the buckets or receptacles 106 which carry the peanuts upwardly to a higher elevation. In order to prevent grass, dirt, trash and debris thrown onto the conveyor by the sweep assembly from interfering with the operation of the idler sprockets 103 in this area, a baffle plate or shield 113 is mounted on each side of the conveyor 97 on the stub shafts 102 which rotatably support the sprockets 103. The receptacles 106 will remove most of the foreign matter from this area and the remainder can be cleaned out periodically.

The lower edges of the baffle plates 113 extend downwardly to a position closely adjacent to the conveyor 97 so that peanuts, weeds and trash cannot pass beneath the baffle plates and interfere with the operation of the sprockets 103 and chains 104. The movement of the endless conveyor shakes the peanuts so that most of the dirt is removed from the peanuts and such dirt and any small rocks are discharged between the rods back to the ground. Preferably, a pair of side plates 114 are attached to the baffle plates 113 and extend upwardly to the upper portion of the frame 96. Such side plates provide a guide for the chains 104 and prevent the conveyor 97 from hitting the side of the combine.

At the upper portion of the frame 96, a chute or hopper 115 connects the upper portion of the frame 96 with the body 22 of the combine preferably in the area of the threshing cylinders so that peanuts which have been picked up from the ground will be discharged into the combine for further cleaning and processing.

Since the upper run of the endless conveyor is generally horizontal, peanuts ordinarily are discharged from the buckets 106 as the buckets pass around the upper idler sprockets 103. In order to receive such peanuts and move the same into the chute 115, an imperforate slide plate 116 is mounted on the frame 96 and has a discharge end overlying the upper end of the chute 115. The opposite end of the slide plate 116 extends outwardly to a position overlying the stub shafts 102 at the upper portion of the frame 96, as illustrated best in FIG. 10. When the peanuts fall by gravity from the buckets 106, such peanuts will be discharged onto the slide plate 116 and continued movement of the buckets across the upper run of the conveyor will sweep the peanuts along the slide plate until the peanuts are discharged from the discharge end of such slide plate into the chute 115.

Figure 2:
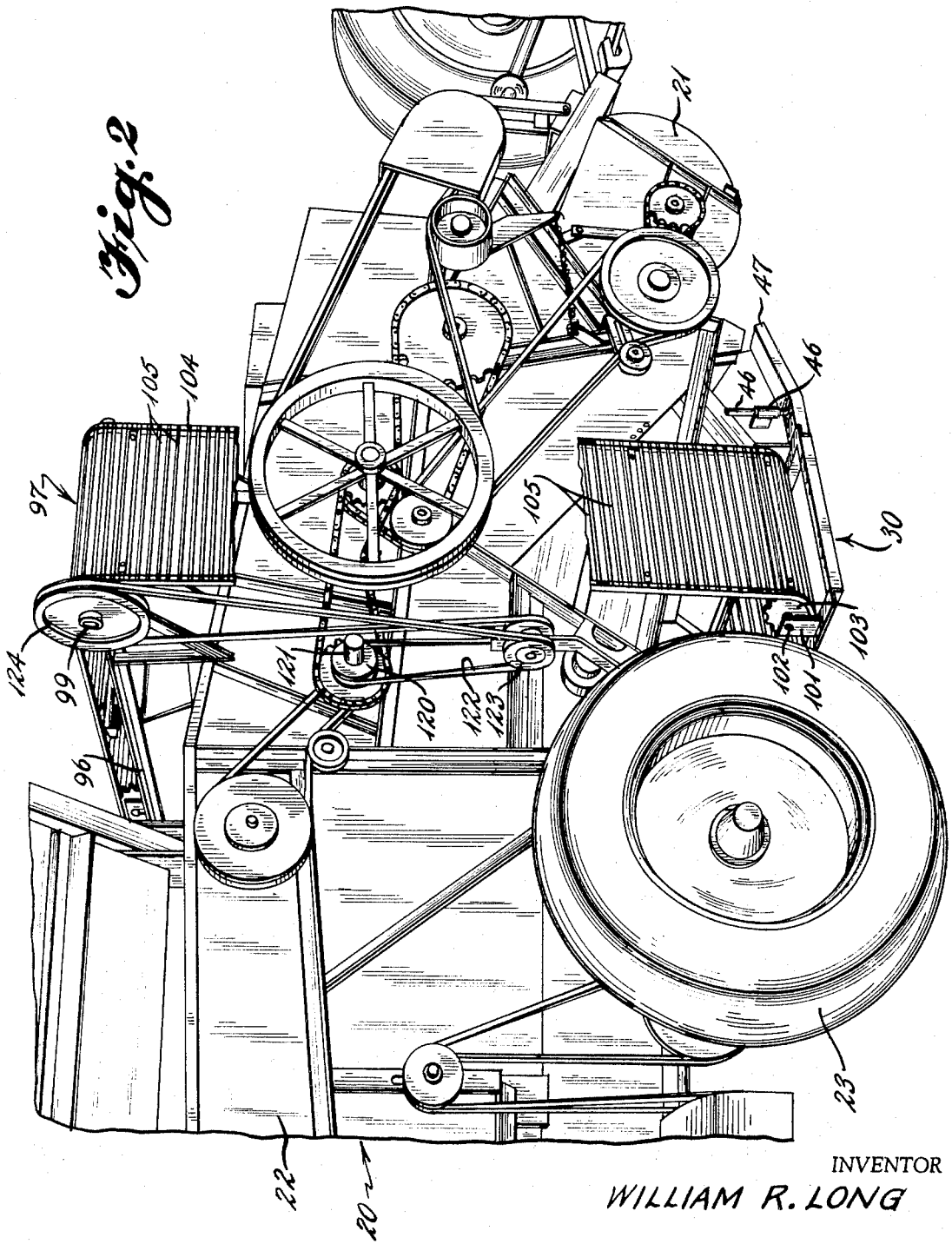
FIG. 2 is a rear perspective of a portion of the other side of the peanut combine.

The endless conveyor 97 can be driven in any desired manner, however, as illustrated in FIG. 2, a drive pulley 120 is mounted on a shaft 121 forming part of the drive mechanism for the elements of the combine such as one of the threshing cylinders. The drive pulley 120 drives a belt 122 over one or more adjustable idler pulleys 123 and then around a driven pulley 124 fixed to the upper elongated shafts 99 of the endless conveyor. If desired, a selectively operable clutch (not shown) may be provided for driving the endless conveyor only when desired.

As illustrated in FIGS. 13–17, a modified form of endless conveyor 125 is provided having a pair of generally parallel chains 126 with spaced inwardly extending opposed lugs 127. The chains 126 are connected together by buckets or receptacles 128 mounted on the opposed lugs 127. In this modification a platform 129 is provided constructed of closely spaced generally laterally extending rods 130 mounted on a subframe 131 by posts 132. The subframe 131 is connected by mounting springs 133 to the frame 96 so that movement of the combine and the endless conveyor 125 will vibrate the subframe 131 to cause dirt and foreign objects thrown onto the platform 129 by the sweep assembly 38 to be discharged back to the ground.

At one end of the platform 129 the rods 130 are bent upwardly at an angle of approximately 45° and terminate in generally vertically disposed end portions 134. Each of the buckets or receptacles 128 is provided with a plurality of fingers 135 adapted to be received between the rods 130 so that such fingers will sweep the peanuts supported between the rods toward the inclined portion of such rods and cause the peanuts to gravitate into the buckets at the inclined and vertical portions of the platform. Peanuts are discharged from the buckets onto a slide plate 116 as previously described.

Although the peanut recovery apparatus 30 has been illustrated and described as attached to a conventional peanut combine, it is contemplated that such unit could be independently mounted on wheels or other support means and either pulled through the field or may be self-propelled. When the recovery apparatus is independently mounted, it can be operated in conjunction with the peanut combine or separately therefrom as long as some means is provided to accommodate the vines either before or during the recovery operation. Also, it is contemplated that the slide plate 116 could be replaced by an angularly disposed auxiliary chute (not shown) having one end disposed above the upper idler stub shafts 102 and the other end terminating at the chute 115 so that peanuts discharged from the buckets 106 or 128 will slide by gravity down the auxiliary chute instead of being swept along the slide plate 116 by the buckets.

In the operation of the device, the sweep assembly 38 causes the spring fingers 52 to rotate at a speed sufficient to sweep the ground without missing any peanuts and sufficient to throw the peanuts from the sweep assembly to the peanut recovery unit. The spring fingers will engage and penetrate the earth to a depth of approximately 1 inch in ordinary cases and lift any mature loose peanuts which have fallen from the vines. The loose peanuts will be carried upwardly around the curved partition 42 by the spring fingers and will be thrown rearwardly from the sweep assembly either onto the endless conveyor 97 or against the deflector 111 from which the peanuts will fall onto the endless conveyor. Simultaneously the endless conveyor 97 is moving in a direction normal to the direction of movement of the combine and carries the peanuts toward one side and up an incline where the peanuts will gravitate into the buckets 106 or 128 and be carried upwardly along the frame 96. At the upper run of the conveyor the peanuts are discharged from the buckets onto a slide plate 116 where they are moved by the buckets toward the central portion of the combine and discharged into the chute 115. From the chute the peanuts fall by gravity into the combine and preferably into the threshing section thereof so that the loose peanuts will be subsequently cleaned and discharged into the hopper 25.

I claim:

1. In a peanut combine having a windrow pickup, separating means and vine discharging means, the improvement comprising a peanut recovery apparatus for recovering loose peanuts from the ground after the vines have been picked up by the combine, said recovery apparatus including sweep means for engaging and lifting peanuts from the ground, a peanut recovery unit for receiving peanuts from said sweep means, said recovery unit including conveyor means having openings of a size to permit dirt to fall therethrough and to retain the peanuts on said conveyor means, said conveyor means having portions extending to an upper level, means for retaining the peanuts on said conveyor means as the conveyor means moves upwardly, and receiving means at the upper level into which peanuts are discharged from said conveyor means.

2. The invention of claim 1, in which the conveyor is inverted at said upper level and thereby dumps the peanuts from the retaining means into the receiving means.

3. The invention of claim 1, in which the sweep means comprises tine means that are mounted to sweep just beneath the surface of the ground in order to recover peanuts that are lodged at a shallow depth.

4. The invention of claim 1, in which the sweep means is mounted on the combine rearwardly of the pickup and ahead of vines discharged from the combine.

5. A peanut recovery apparatus mounted for movement through a peanut field for recovering loose peanuts from the ground comprising a sweep assembly including substantially arcuate wall means having its lower portion located adjacent to the ground and curving upwardly therefrom, said assembly having sweep means extending substantially laterally of the direction of movement through the field, said sweep means including shaft means mounted in spaced relation to said wall means, tine means mounted on said shaft means, means for rotating said shaft means so that the tine means lifts peanuts from the ground and moves the same upwardly along said wall means, and a peanut recovery unit having portions located adjacent to said sweep means, said recovery unit including conveyor means having peanut holding means mounted on said frame, said conveyor means mounted for movement substantially transverse to the intended direction of movement through the field and having an elevating portion to raise said recovered peanuts to a higher elevation for discharge.

6. The structure of claim 5 including means associated with said peanut recovery unit for causing peanuts discharged from said sweep assembly to be deposited on said conveyor means.

7. The structure of claim 5 in which conveyor means has openings of a size to permit dirt to fall therethrough but to retain the peanuts thereon.

8. The structure of claim 5 in which said peanut holding means includes a plurality of spaced receptacles mounted along said conveyor means.

9. The structure of claim 5 in which said tine means includes a plurality of removably mounted spring fingers.

10. The structure of claim 5 including ground-engaging means for supporting said sweep assembly and means for selectively raising said sweep assembly out of engagement with the ground.

11. The structure of claim 5 in which said conveyor means includes a pair of generally parallel chains, a plurality of closely spaced rods connecting said chains, said rods being spaced apart a distance sufficient to retain mature peanuts while permitting dirt and small objects to fall therethrough.

12. The structure of claim 5 in which said conveyor means includes an endless conveyor having upper and lower runs, said lower run located adjacent to said sweep assembly, and chute means associated with said upper run and located in a position to receive peanuts discharged from said peanut holding means.

13. The structure of claim 5 in which said conveyor means includes a pair of generally parallel endless chains having upper and lower runs, a sub-frame located between the lower runs of said chains, said sub-frame including a multiplicity of closely spaced rods disposed along the direction of movement of said chains, said peanut holding means including a plurality of spaced receptacles connecting said pair of chains, and means for causing peanuts on said sub-frame to be collected within said receptacles.

14. A peanut recovery apparatus for recovering loose peanuts from the ground comprising a sweep assembly including end plates connected by an arcuate partition, a shaft connecting said end plates, a plurality of spring fingers mounted on said shaft and being of a length to extend beyond the lower surface of said end plates and into engagement with the ground, means for rotating said shaft so that the spring fingers will lift loose peanuts from the ground and raise the same past said arcuate partition, a peanut recovery unit having portions located adjacent to said sweep assembly, said recovery unit including a frame, a flexible endless conveyor carried by said frame, a plurality of spaced generally parallel buckets mounted on said conveyor, said conveyor adapted to receive loose peanuts from said sweep assembly, means for transferring peanuts from said conveyor to said buckets, said endless conveyor adapted to raise said buckets to a higher elevation and discharge the peanuts therefrom, chute means connecting said frame to peanut receiving means, means for moving the peanuts discharged from said buckets into said chute means, and means for driving said endless conveyor, whereby loose peanuts will be picked up from the ground by said sweep assembly and transferred to said conveyor where the peanuts will be collected in buckets, raised to a higher elevation, and subsequently discharged into said peanut receiving means.

* * * * *

PO-1050
(5/69)

UNITED STATES PATENT OFFICE
CERTIFICATE OF CORRECTION

Patent No. 3,678,667  Dated July 25, 1972

Inventor(s) William R. Long

It is certified that error appears in the above-identified patent and that said Letters Patent are hereby corrected as shown below:

Column 8, Line 52, add the following claim:

15. The structure of Claim 11 including means for vibrating the rods along certain portions of said conveyor means to dislodge dirt clinging to the peanuts.

Signed and sealed this 29th day of May 1973.

(SEAL)
Attest:

EDWARD M. FLETCHER, JR.
Attesting Officer

ROBERT GOTTSCHALK
Commissioner of Patents